United States Patent [19]
Corby, Jr. et al.

[11] Patent Number: 5,682,506

[45] Date of Patent: Oct. 28, 1997

[54] METHOD AND SYSTEM FOR GROUP VISUALIZATION OF VIRTUAL OBJECTS

[75] Inventors: Nelson Raymond Corby, Jr., Scotia; William Edward Lorensen, Ballston Lake, both of N.Y.

[73] Assignee: General Electric Company, Schenectady, N.Y.

[21] Appl. No.: 667,747

[22] Filed: Jul. 5, 1996

Related U.S. Application Data

[63] Continuation of Ser. No. 304,296, Sep. 12, 1994, abandoned.

[51] Int. Cl.$^6$ .................................................. G06T 15/00
[52] U.S. Cl. ........................... 395/119; 395/129; 395/329
[58] Field of Search .................................. 395/119, 125, 395/806, 173, 174, 329; 382/154; 345/7, 8, 9, 113; 348/42, 51; 359/462

[56] References Cited

U.S. PATENT DOCUMENTS

| | | | |
|---|---|---|---|
| 5,130,794 | 7/1992 | Ritchey | 358/87 |
| 5,137,450 | 8/1992 | Thomas | 434/44 |
| 5,287,437 | 2/1994 | Deering | 395/127 |
| 5,297,061 | 3/1994 | Dementhon et al. | 364/559 |
| 5,335,323 | 8/1994 | Kolnick | 395/164 |
| 5,365,370 | 11/1994 | Hudgins | 359/464 |
| 5,367,627 | 11/1994 | Johnson | 395/161 |
| 5,410,371 | 4/1995 | Lambert | 348/769 |
| 5,414,544 | 5/1995 | Aoyagi | 359/53 |

OTHER PUBLICATIONS

Kreger et al., "The responsive workbench", IEEE Computer Graphics and Application, 1994, pp. 12–15.

Hodges, "Tutorial: Time–Multiplexed Stereoscopic Computer Graphics", *IEEE Computer Graphics & Application*, 1992, pp. 20–30.

Ishii et al., "Design of Team/Workstation: A Realtime Shared Workspace fusing Desktops and Computer Screens", Proceedings of COIS'90, pp. 131–142.

Foley et al., "Computer Graphics: Principles and Practice", Addison–Wesley Publishing Company, 1990, p. 595.

"Viewpoint Dependent Imaging: An Interactive Stereoscopic Display" by Scott S. Fisher, 10/81, pp. 1–73 (Master's Thesis for Massachusetts Institute of Technology).

*Primary Examiner*—Mark K. Zimmerman
*Assistant Examiner*—Stephen Hong
*Attorney, Agent, or Firm*—Lawrence P. Zale; Marvin Snyder

[57] ABSTRACT

A group visualization system allowing users of a group, either at a local site or a remote site to view images personalized to each users specific needs. Each user of the team interactively selects personalize viewing parameters, such as portions of the model to be displayed and the angle to view the model. Each user may select an overlay map to be superimposed on the model and displayed in the same manner which the model is displayed. A user who is an electrical engineer may select a voltage overlay, which a mechanical engineer may select a stress/strain overlay of the same model. Each user may select the parameters specified by another user or users, either at the local site or a remote sites, to see what they are viewing. Each user has access to a pointer which allows each user to specify a location which a symbol is superimposed and is visible to selected users. This results in a tool allowing users of a group at various sites to act as a team interact with each other.

7 Claims, 1 Drawing Sheet

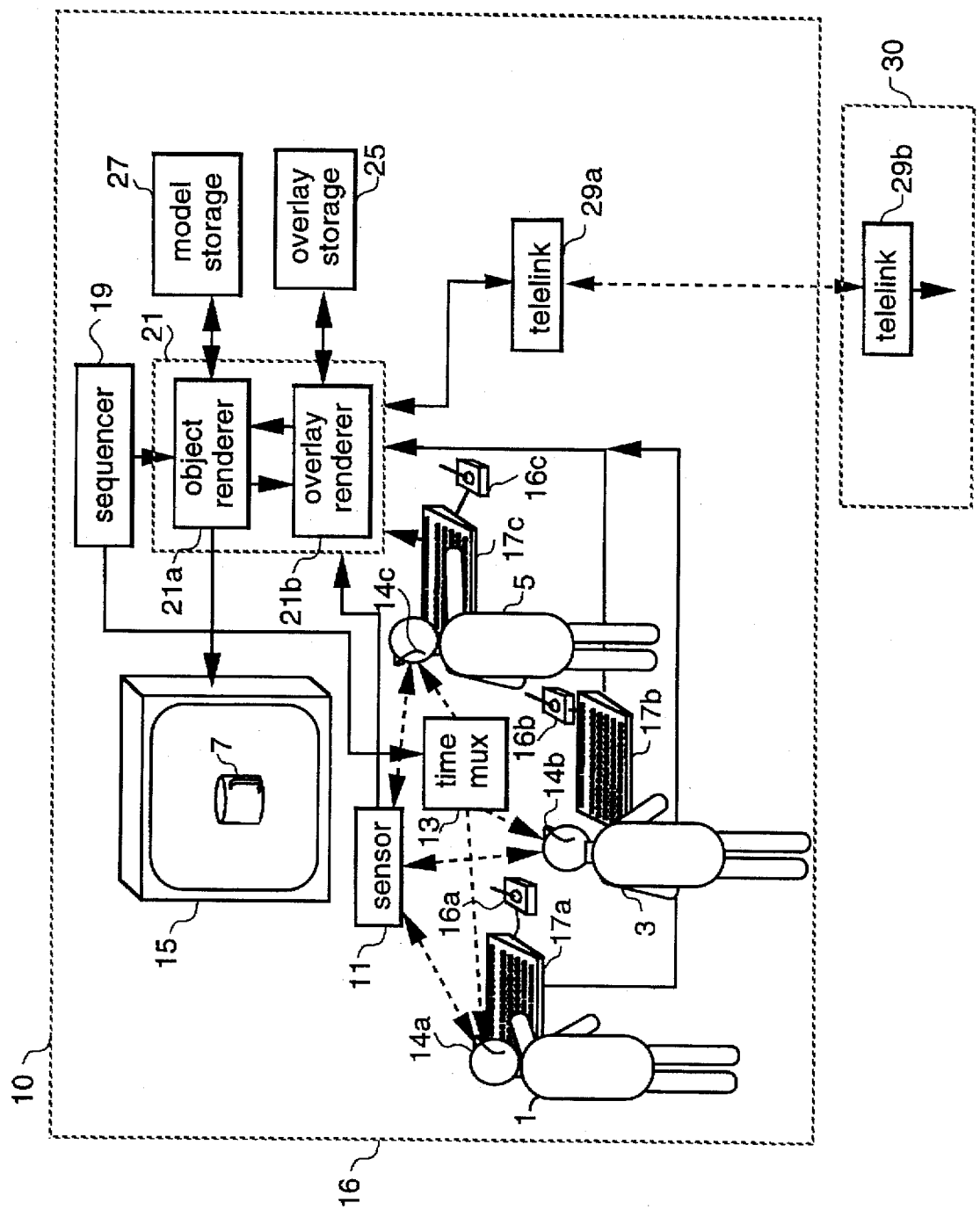

and/or keyboards 18a, 18b, 18c to create the input signals. Input devices 17a, 17b and 17c may be any number of known input devices such as a 'mouse', 'joystick', 'trackball', touch pad, light pen, data glove, head tracker, eye tracker, or body tracker.

METHOD AND SYSTEM FOR GROUP VISUALIZATION OF VIRTUAL OBJECTS

This application is a continuation of application Ser. No. 08/304,296 filed Sep. 12, 1994, now abandoned.

BACKGROUND OF THE INVENTION

1. Field of the Invention

The present invention is related to visualization of computer generated models, and more specifically to a method and apparatus for allowing a group of users to view and interact with scenes displayed from a common computer graphics model.

2. Description of Related Art

A rapidly growing area of computer graphics applications is virtual reality systems. Such systems attempt to "immerse" the viewer in an artificial world in which synthetic objects are created, viewed, modified, and examined. Typically the virtual reality participant puts on a pair of small CRT goggles which deliver synthetically generated graphics images of some scene or object to be viewed to each eye, thus forming a 3D image. In order to be realistic, the images are updated rapidly as the position of the viewer in relation to the viewed object changes. Thus, for example, the viewer could "walk around" a 6 foot tall model of a molecule and obtain varying views of the model.

In practical applications such as surgical planning, training situations, engineering analysis and military command and control situations, there is often the need for a small team to view three-dimensional graphic displays with the intent of jointly observing and analyzing the contents of the display. The team may consist of a mechanical engineer, a thermal engineer, etc. A mechanical engineer of the team would have different needs relating to a computer-generated model as compared with a thermal engineer of the team. Also, there may be many sets of data associated with a computer-generated model being viewed and would be confusing to display all sets of information at one time.

One could attempt to use currently available virtual reality hardware and software to construct a system to display computer-generated models to a team. Head mounted displays can be purchased. Systems to sense position and orientation of the viewer in space exist. CAD software to create 3D object models exists. 3D rendering software and computers (such as those from SUN and Silicon Graphics) exist. However, a system formed from these components does not effectively and efficiently allow a small team to work together since the existing systems are typically designed for a single user, or are designed for multiple users without coordination between the views each user sees, and specific needs of each viewer.

Currently, there is a need for a system which allows members of a team, which may be remotely located, to view personalized displays of a computer-generated model, and to interact with the other team members with reference to the computer-generated model.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawing, in which:

FIG. 1 is a simplified block diagram of a teamview system allowing personalized group visualization of virtual objects in accordance with the present invention.

SUMMARY OF THE INVENTION

A group visualization allowing a group of users located locally or remotely, to interactively with each other and view a computer generated image.

A computer graphic model is previously stored in a model storage device at each of the sites.

Each user interactively selects viewing parameters, such as portions of the model to be viewed and orientation of the model through an input device. They may select personalized viewing parameters of other users, thereby 'standing in the other's shoes'.

A renderer creates an object image from the stored model, for each user, according to the personalized viewing parameters selected by the user, and displays the image individually to each user on a monitor. An input device allows each user to specify a location relative to the model and the renderer displays a symbol at this location which is visible to other user, allowing them to interact.

Measurements pertaining to locations of the model, or overlay maps, are stored at each site in an overlay storage device. These overlay maps are superimposed in the proper manner by the renderer, or for greater speed, by a dedicated overlay renderer.

A telelink allows remote sites to interact as if they were located in the same site. Only the selected personalized viewing parameters, pointer locations, and overlay selection are required to sent over the telelink during visualization, since each site has a local copy of the model and overlay maps. This greatly reduces information traffic between the local and remote sites, and speeds up the system.

OBJECTS OF THE INVENTION

It is an object of the present invention to provide a system and method for providing a personalized view and overlay map of physical characteristics of a computer generated model to members of a team.

It is another object of the present invention to provide a system and method for allowing remotely located members of a team to view a computer generated model and interact with each other with reference to the model.

DETAILED DESCRIPTION OF THE INVENTION

The present invention addresses the problems mentioned in the background section by providing the system shown in FIG. 1. Users 1, 3 and 5 are part of the team working together on a project which involves group visualization of a virtual object, or computer generated model, which has been previously stored in a model storage unit 27.

A sensor device 11 tracks the position of users 1, 3 and 5 in order to determine their absolute position and their relative position with respect to a monitor 15.

Since sensor 11 can track the position and orientation of users 1, 3 and 5, possibly by tracking the position and orientation of view glasses 14a, 14b and 14c, sensor 11 may know at any time the relative orientation between monitor 15 and users 1, 3 and 5.

Users may indicate through input devices 17a, 17b and 17c an angle, orientation and scale they would like view a virtual object 7, and also to define cut planes in order to cut away sections of virtual model 7. After selecting the proper viewing parameters, the user may indicate a structure, or point to a location on virtual object 7. Input devices 17a, 17b and 17c may be connected to pointing devices 16a, 16b, 16c allowing a user, such as user 1 to point to a specific location on virtual object 7 such that users 3 and 5 may see a symbol indicating the position which user 1 is pointing to. Similarly, users 3 and 5 may also point to structures on virtual object 7.

By indicating such on the appropriate input device, each user may also indicate that they may want to "stand in the shoes of another user", and see the computer generated model as the other user would see it. This allows each to alter the viewing position, orientation, viewing scale and overlay mapping.

The input provided by users 1, 3 and 5 are provided to a renderer 2 1 which interacts with a model storage device 27 to display an image of a model on monitor 15. Renderer 21 may use conventional rendering techniques such that the users see the portions of surfaces selected in an appropriate angle, scaling, etc.

An overlay storage device 25 has previously stored information relating to aspects of the model or information computed during viewing. These aspects may be temperature profiles, stress/strain profiles, magnetic or electrical flux, etc. This data typically varies according to position along the model. Since it varies spatially according to position within the model, these typically are known as overlay maps. Renderer 21 typically provides three-dimensional rendering of the model previously stored in model storage unit 27. Renderer 21 may also rotate, scale, and clip the overlay map from overlay storage unit 25. Since the overlay data only has validity when it overlays the specific locations of the model to which they pertain, an overlap map must be rendered such that locations of the overlay map correspond to locations of the model.

Partial overlap maps may be used, and any coherent use of multiple overlays may also be used. In order to speed up the system, a separate object renderer 21a is employed to render the model with another board, overlay renderer 21b, rendering the overlap map in the same manner, instead of having both the model and the overlap map rendered by the same renderer 21.

The image displayed to each of the users is customized or selected by input from the user. For instance, if user 1 was a mechanical engineer and desired to see stress and strain overlays, he would indicate such through input device 17a to controller 23. This information would be passed to renderer 21 such that overlay map would be supplied from overlay storage device 25 and overlaid and displayed to user. Similarly, user 3 would indicate the type of image to be displayed through input device 17b.

Each of the users may also specify personalized parameters as to how overlay data may be displayed. An example may be assigning overlay data value ranges for color coding. This information may then be provided and passed to other users.

In the embodiment of FIG. 1, a single monitor 15 is employed to display the different images to each user. This is accomplished by time multiplexing. A sequencer 19 provides a timing signal to renderer 21 and to a time multiplexer 13. The renderer creates an image specific to each of the users 1, 3 and 5 and displays it in a time sequence fashion to users 1, 3 and 5. This may be accomplished by having the users 1, 3 and 5 where view glasses 14a, 14b and 14c, respectively. These view glasses are responsive to time multiplexer 13 and are designed to block vision like the vision of the users for images being displayed for other users, and to allow the user to see images intended for that user. Renderer 21 displays an image intended for user 1 at the same time multiplexer 13 blocks the vision for users 3 and 5 by making view glasses 14b and 14c opaque when the image is being displayed. When renderer 21 provides an image intended for user 3, view glasses 14a and 14c are opaque while 14b are transparent.

The system, as explained up until this point, involves visualization of a group of users at the same location, also known as "co-located". The present invention also envisions using telelink units 29a, 29b which provides information of the number of users, and the orientation angle, scale, overlay maps, and other inputs relating to the display each user is currently viewing. The co-located site and all of its elements are referred to as site 10. The telelinks 29a provides the information regarding the views of each of the users and any pointing information to telelink 29b of a remote site 30. Remote site 30 has all of the same elements as that of site 10 and functions such that users of remote site 30 may view and interact with model 7 in the same fashion as if they were co-located with users 1, 3 and 5.

Since most of the image processing is performed locally, at each site, there is very lit fie telelink traffic which needs to be transmitted through telelinks 29a, 29b. Each site has its own model data storage and overlay data storage and each should be loaded with the proper model data and overlay data. This downloading and storage of model and overlay data may be performed 'off-line' such that during actual group viewing and interaction there is very little information through telelinks 29a, 29b between sites. This allows very rapid image display and interaction.

Telelinks may use any method of conventional data communication to interact with remote sites. This may involve telephone lines, data lines or even radio link.

In another embodiment of the present invention, sensor 11 may indicate, not only the position of each of the users, but provide an offset to indicate the position of each of the user's eyes. Renderer 21 then provides stereoscopic images to each of the users. Therefore, if three users are viewing images at three different viewing parameters, six images are interleaved and provided to each of the eyes of users 1, 3 and 5. View glasses 14a, 14b and 14c must be able then to independently pass, or block images to each of the user's eyes. As the number of users increases, the amount of 'flicker' may also increase. At some point there will be a limit to the number of viewers viewing from a single monitor.

For two users, A and B, and stereoscopic vision, a possible method of interleaving the images is as follows:

| Time slice: | 1 | 2 | 3 | 4 |
| --- | --- | --- | --- | --- |
| Video: | A (left) | B (left) | A (right) | B (right) |
| A (left): | Open | Closed | Closed | Closed |
| A (right): | Closed | Closed | Open | Closed |
| B (left): | Closed | Open | Closed | Closed |
| B (right): | Closed | Closed | Closed | Open | where left and right refer to the left and fight eye-specific computed image. Other sequences exist and may be used.

In another embodiment, renderer 21 provides a single image to each user, two images in the case of stereoscopic vision, and each user has his own monitor to view. In the case of three users 1, 3 and 5, there would be three monitors, one for each user all driven by renderer 21.

Another embodiment of the present invention allows users to see a normal view of their surroundings while viewing the virtual object. This may be done with glasses 14a, 14b, and 14c being semi-transparent, with a virtual image superimposed upon the lenses.

Thus, it can be seen that the present system has a wide range of application to situations where several people wish to be able to realistically view a virtual object in a manner that is similar to actually viewing the real object floating in space before them. Alternatively, they may also desire to view completely different scenes, as in the control room example, on the same display.

While specific embodiments of the invention have been illustrated and described herein, it is realized that modifications and changes will occur to those skilled in the an. It is therefore to be understood that the appended claims are intended to cover all such modifications and changes as fall within the true spirit and scope of the invention.

What we claim is:

1. A group visualization system for allowing groups of co-located users to interactively view a computer generated image of a stored model on a single screen at a plurality of sites, each site comprising:
   a) a model storage device for storing a computer graphic model;
   b) an input device for each user, allowing the user to interactively select their own viewing parameters, such as surfaces of the model to be viewed, scale, viewing angle and orientation of the model;
   c) a shared monitor for displaying computer graphic images provided to it;
   d) a position sensor which tracks the position of each user;
   e) a renderer functionally coupled to the input device, the model storage device, the position sensor, and the monitor, for creating personalized object images of surfaces of the model from the stored model, for each user according to their own selected viewing parameters selected by the user, the users position, and for displaying each personalized image individually only to its corresponding user, and other selected users, on the shared monitor;
   f) view glasses positioned on each user capable of either allowing or blocking vision of the user in response to an external signal;
   g) a time multiplexer, "time mux", coupled to the glasses of the users, for producing a signal causing the glasses to block or allow vision of the users;
   h) a sequencer functionally coupled to the input devices, the renderer and the time mux, for providing timing coordination to the renderer and the time mux causing the shared monitor to display an image to an intended user at the same time that the glasses of the intended users allow vision, while the glasses block their vision of the other users not intended to view the image, thereby providing different images to different users on the same shared monitor.

2. The group visualization system of claim 1 further comprising:
   at least one pointer for interacting with at least one user allowing the user to independently define a location relative to the model; and for providing the location to the renderer causing a symbol to be superimposed on the personalized image at the location defined by the user, to at least one other selected user.

3. The group visualization system of claim 1 further comprising:
   a) an overlay storage device having previously stored physical measurement values each pertaining to a location of the model, which may be referred to as an overlay map; and
   b) an overlay renderer for displaying an overlay map selected by a user superimposed upon the personalized image only to the user selecting the location, and other users selected by the user selecting the location.

4. The group visualization system of claim 1 further comprising a telelink coupled to a remote site for a passing selected personalized viewing parameters, overlay maps, pointer locations of the users between the remote site and a local site, such that users at the sites may select the same images to view, and interact with each other.

5. The group visualization system of claim 3 wherein:
   the overlay storage device has previously stored measurements of electrical properties each pertaining to a location of the model, which are referred to as the overlay map.

6. The group visualization system of claim 3 wherein:
   the overlay storage device has previously stored measurements of thermal properties each pertaining to a location of the model, which are referred to as the overlay map.

7. The group visualization system of claim 3 wherein:
   the overlay storage device has previously stored measurements of mechanical properties each pertaining to a location of the model, which are referred to as the overlay map.

* * * * *